(12) United States Patent
Kim et al.

(10) Patent No.: US 8,749,555 B2
(45) Date of Patent: Jun. 10, 2014

(54) METHOD OF PROCESSING THREE-DIMENSIONAL IMAGE IN MOBILE DEVICE

(75) Inventors: Tae Seong Kim, Seoul (KR); Min Jeong Lee, Seoul (KR); Hang Shin Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 216 days.

(21) Appl. No.: 12/420,004

(22) Filed: Apr. 7, 2009

(65) Prior Publication Data

US 2009/0195539 A1  Aug. 6, 2009

Related U.S. Application Data

(63) Continuation of application No. 11/326,839, filed on Jan. 6, 2006, now abandoned.

(30) Foreign Application Priority Data

Jan. 7, 2005  (KR) ......................... 10-2005-0001843

(51) Int. Cl.
*G06T 13/00*  (2011.01)
*G06K 9/46*  (2006.01)
*G06K 9/48*  (2006.01)

(52) U.S. Cl.
USPC ............................. 345/473; 382/165; 382/190

(58) Field of Classification Search
USPC ........................................................ 345/473
See application file for complete search history.

(56) References Cited

U.S. PATENT DOCUMENTS

| | | | | |
|---|---|---|---|---|
| 4,053,704 A * | 10/1977 | Smith | ............................. | 174/87 |
| 4,703,512 A * | 10/1987 | Saka et al. | .................... | 382/199 |
| 4,843,568 A * | 6/1989 | Krueger et al. | ............... | 382/100 |
| 5,261,041 A * | 11/1993 | Susman | ........................ | 345/473 |
| 5,616,078 A * | 4/1997 | Oh | ................................... | 463/8 |
| 5,682,196 A | 10/1997 | Freeman | | |
| 6,064,749 A * | 5/2000 | Hirota et al. | .................. | 382/103 |
| 6,191,773 B1 * | 2/2001 | Maruno et al. | ................ | 345/158 |

(Continued)

FOREIGN PATENT DOCUMENTS

| | | |
|---|---|---|
| JP | 2004336687 | 11/2004 |
| KR | 10-0331827 | 4/2002 |
| KR | 10-0599158 | 7/2006 |
| KR | 10-0641435 | 10/2006 |

OTHER PUBLICATIONS

Bowman, D.A., Jun. 1999, "Interaction Techniques for Common Tasks in Immersive Virtual Environments: Design, Evaluation, and Application", Ph.D. thesis, Virginia Polytechnic & State University, 142 pages.*

(Continued)

*Primary Examiner* — Ulka Chauhan
*Assistant Examiner* — Roberta D Prendergast
(74) *Attorney, Agent, or Firm* — Lee, Hong, Degerman, Kang & Waimey (57) ABSTRACT

A processing method of interfacing a 3D image and a camera image is provided. In the processing method, a specific image pattern defined by a user is recognized, the recognized pattern is traced within an image, and a camera image and a 3D image are interfaced based on the tracing result. A 3D object is animated and rendered using a 3D graphic engine. The rendered image of the 3D object and the camera image are integrated and displayed.

17 Claims, 5 Drawing Sheets

(56) References Cited

U.S. PATENT DOCUMENTS

| | | | |
|---|---|---|---|
| 6,319,121 B1* | 11/2001 | Yamada et al. | 463/8 |
| 6,330,356 B1* | 12/2001 | Sundareswaran et al. | 382/154 |
| 6,361,438 B1* | 3/2002 | Morihira | 463/31 |
| 6,522,312 B2* | 2/2003 | Ohshima et al. | 345/8 |
| 6,878,058 B1* | 4/2005 | Serizawa et al. | 463/8 |
| 6,937,255 B2* | 8/2005 | Fukuda et al. | 345/633 |
| 6,951,515 B2* | 10/2005 | Ohshima et al. | 463/31 |
| 7,227,526 B2* | 6/2007 | Hildreth et al. | 345/156 |
| 7,371,164 B2* | 5/2008 | Ueshima | 463/8 |
| 2002/0065121 A1* | 5/2002 | Fukunaga et al. | 463/8 |
| 2002/0191862 A1* | 12/2002 | Neumann et al. | 382/284 |
| 2003/0048280 A1* | 3/2003 | Russell | 345/619 |
| 2003/0179204 A1* | 9/2003 | Mochizuki et al. | 345/473 |
| 2004/0071346 A1* | 4/2004 | Clark et al. | 382/209 |
| 2004/0136567 A1* | 7/2004 | Billinghurst et al. | 382/103 |
| 2004/0172217 A1* | 9/2004 | Fischer | 702/182 |
| 2005/0001852 A1* | 1/2005 | Dengler et al. | 345/633 |
| 2005/0071306 A1* | 3/2005 | Kruszewski et al. | 706/47 |

OTHER PUBLICATIONS

Mark Raymond Mine, Mar. 1998, "Exploiting Proprioception in Virtual-Environment Interaction", Ph.D. Dissertation, University of North Carolina at Chapel Hill, Chapel Hill, NC, USA, 178 pages.*

J. A. Paradiso, K. Hsiao, J. Strickon, J. Lifton, and A. Adler, 2000, "Sensor systems for interactive surfaces", IBM Systems Journal, vol. 39, Issue 3-4, Jul. 2000, pp. 892-914.*

Faloutsos, Petros. "Composable Controllers for Physics-Based Character Animation." PhD diss., University of Toronto, 2002.*

Matthew Moore and Jane Wilhelms, 1988, "Collision Detection and Response for Computer Animation", Proceedings of the 15th annual conference on Computer graphics and interactive techniques (SIGGRAPH '88), Richard J. Beach (Ed.), ACM, New York, NY, USA, pp. 289-298.*

* cited by examiner

METHOD OF PROCESSING THREE-DIMENSIONAL IMAGE IN MOBILE DEVICE

CROSS-REFERENCE TO RELATED APPLICATIONS

This application is a continuation of U.S. application Ser. No. 11/326,839, filed Jan. 6, 2006, now abandoned, which claims the benefit of earlier filing date and right of priority to Korean Patent Application No. 10-2005-0001843 filed on Jan. 7, 2005, the contents of which are hereby incorporated by reference herein in their entirety.

BACKGROUND OF THE INVENTION

1. Field of the Invention

The present invention relates to a processing method of interfacing a three-dimensional (3D) image and a camera image in a mobile device.

2. Description of the Related Art

Cameras with several hundred thousand to several million pixels tend to be built in mobile devices that are represented by a mobile phone. Various kinds of mobile devices with various functions are commercially available. Examples of the mobile devices are mobile phone, personal digital assistant (PDA), smart phone, portable multimedia player (PMP), and MP3 player. Using the cameras built in the mobile devices, an image can be directly acquired and the acquired image can be stored in the device and can also be transmitted or edited.

In mobile device markets, generalization of various kinds of mobile devices with built-in cameras is in progress. At the same time, various applications using the mobile devices have been developed and released. The mobile devices and the applications support a function of acquiring photograph or moving picture, a function of transmitting the acquired photograph or moving picture to a PC or another mobile device and storing it, a function of editing and searching the photograph or moving picture, and a function of transmitting the photograph or moving picture to a personal homepage or Blog in Internet site and displaying it.

In the mobile device, an image processing makes it possible to acquire an image by means of the camera and display a 2D or 3D graphic image. A representative application using the 3D display function is a 3D game. The 3D game has been introduced as a new trend in game markets of the mobile device, which have been limited to two-dimension.

The interface of an existing camera and a 3D image system has been performed in a PC or arcade game system. For example, a motion of a gamer (user) is traced by an inter-frame image flow in a user image inputted by the camera. A response suitable for the 3D graphic image based on an estimation result of the user's motion is applied. In this manner, the user can enjoy the 3D game.

In the existing PC or arcade game system, the interface between the camera image and the 3D graphic engine requires complicated operations, including an analysis of an image in each frame, a calculation and matching of the motion, and so on. For this reason, it is very inefficient to directly apply the interface system to the mobile device having a relatively low performance processor compared with the PC or arcade game system. In addition, if concurrently using a 3D display having a relatively large amount of calculation compared with a 2D image, a real-time display and interaction cannot be secured and thus the application may be greatly limited.

In order to use the interface system in the mobile device, a solution having a simpler and faster response has to be developed. Therefore, there is a demand for a processing system that can interface the camera image and the 3D graphic engine in the mobile device having the camera and the 3D graphic engine mounted thereon.

SUMMARY OF THE INVENTION

Accordingly, the present invention is directed to a method of processing a 3D image in a mobile device that substantially obviate one or more problems due to limitations and disadvantages of the related art.

An object of the present invention is to provide a method of processing a 3D image in a mobile device, capable of interfacing a camera image and a 3D graphic engine and securing a real-time operation.

Another object of the present invention is to provide a processing method of interfacing a 3D image and a camera image. In the processing method, a specific image pattern defined by a user is recognized, the recognized pattern is traced within an image, and a camera image and a 3D image are interfaced based on the tracing result. A 3D object is animated and rendered using a 3D graphic engine. The rendered image of the 3D object and the camera image are integrated and displayed.

A further object of the present invention is to provide a method of processing a 3D image in a mobile device, in which an image acquired by a camera can be used as a kind of a user interface and an interaction can be executed through various motions in front of the camera by using the camera as the user interface. Also, an interaction with the contents within the mobile device can be executed by the motion itself of the mobile device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a method of processing a 3D image in a mobile device, the mobile device having a camera and a 3D graphic engine, the method including: recognizing a specific pattern designated by a user based on images inputted by the camera, and setting the recognized pattern as a defined pattern; tracing the defined pattern among the images inputted by the camera, and interfacing the pattern and a 3D image; and performing an animation process followed by a response of a corresponding 3D image in accordance with the tracing result of the pattern interfaced with the 3D image, integrating the processed image and the camera image, and displaying the integrated image.

In another aspect of the present invention, there is provided a method of processing an interface between a camera image and a graphic image, including: setting a specific pattern of an image as an image-based interface tool; recognizing the set pattern among images inputted by a camera, and tracing the recognized pattern; generating a response of a graphic image in accordance with the pattern tracing; and combining the traced pattern and the responding graphic image, and displaying the combined image.

A system that can allow the interaction through the interface of the camera and the 3D graphic engine that are built in the mobile device is implemented. The present invention can be applied to the 3D graphic based game of the mobile device. By using the camera as a new interface in addition to a 2D or 3D game based on the exiting key manipulation, a user's motion is inputted through the camera. Therefore, an interaction with a 3D object on the screen can be undergone in an interface environment of a real space and a virtual space.

Also, in an application such as a pet avatar, an operation of directly caressing or punishing a 3D object can be possible. An operation of taking a picture with a pet object can be possible.

Further, since the camera image can be used as a kind of a user interface, an interaction can be executed through various motions in front of the camera. Also, an interaction with the contents within the mobile device can be executed by the motion itself of the mobile device. The camera image can be used as various user interfaces through a combination of an existing key, a fingerprint sensor, a gravity sensor, and a joystick.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, a method of processing a 3D image in a mobile device according to the present invention will be described in detail with reference to the accompanying drawings.

Figure 1:
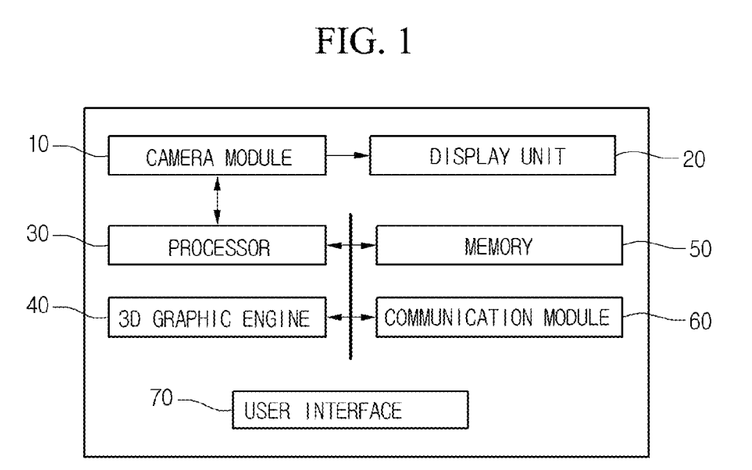
FIG. 1 is a block diagram of a mobile device according to the present invention.

FIG. 1 is a block diagram of a mobile device according to the present invention. Examples of the mobile device are PDA, PDA phone, smart phone, notebook computer, and PMP, on which a camera is mounted. In FIG. 1, a mobile phone with a built-in camera is illustrated as an example.

Referring to FIG. 1, the mobile device according to the present invention includes a camera module 10 for acquiring an image, a display unit 20 for displaying an image, a processor 30 for managing a pattern recognition, a pattern tracing, and a control of an interface display with a 3D image, a 3D graphic engine 40 for processing the 3D graphic image, a memory 50 for storing data, a communication module 60 for performing a wired/wireless communication, and a user interface 70 for allowing a user to manipulate the device.

The camera module 10 takes an image of an object (including the user himself/herself) designated by the user, and processes the taken image and then transmits the processed image to the display unit 20. Under control of the processor 30, the camera image may be stored in the memory 50 or transmitted through the communication module 60. The processor 30 displays the image taken by the camera module 10, stores it in the memory 50, or performs a transmission-related control, and manages a signal processing and control, such as a pattern recognition, a setting, a tracing, and an interface display of the pattern for interface with a 3D graphic engine. The latter function may be contained in a 3D graphic system. The 3D graphic engine 40 constructs and outputs a 3D animation image and performs an animating process followed by a predetermined response corresponding to the result of a specific pattern tracing within the camera image. The user interface 70 is generally a key input unit. Meanwhile, in some cases, the user interface 70 may be a fingerprint sensor, a gravity sensor, a joystick, or a touch screen.

Figure 2:
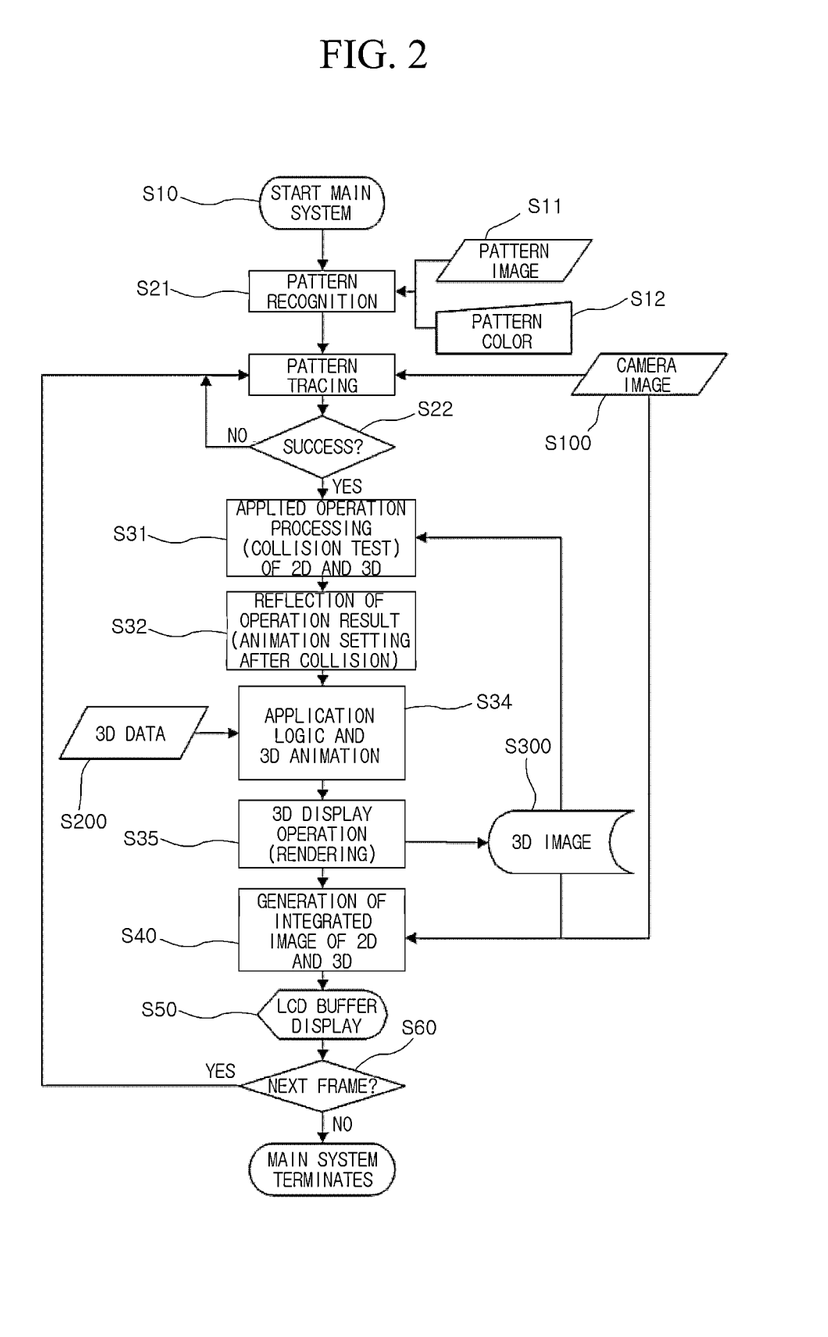
FIG. 2 is a flowchart illustrating a method of interfacing a camera image and a 3D graphic engine according to the present invention.

FIG. 2 is a flowchart illustrating a method of interfacing a camera image and a 3D image in the mobile device with the camera module and the 3D graphic engine.

In operation S10, a specific pattern is defined in a 2D image inputted from the camera. This operation is performed for defining the specific pattern and tracing the movement of the specific pattern, instead of tracing all moving portions of the camera image.

In an entire system, the pattern recognition corresponds to an initialization operation. The pattern recognition is executed when the system starts, or it is called and executed so as to re-designate the pattern when the pattern tracing fails. Also, the pattern recognition is executed when an application program level is forcedly called, for example, when the user designates a new pattern.

In this embodiment, the pattern is defined using a user-oriented passive method. The definition of the pattern using the user-oriented passive method is for the purpose of allowing the user to accurately define desired pattern. In addition, it aims to provide flexibility such that the user can designate desired feature as a pattern.

In this embodiment, the specific pattern can be defined as one of an input image S11, a color S12 designated by the user, and a region. First, an image intended to be set as the pattern is taken by the camera. Then, if the color is designated, a color designated in a specific threshold range within the corresponding image is detected and the detected color is set as the pattern. If the region is inputted, the user can directly designate the region by moving a pointer within the image. This can be simply implemented by a method of setting a region by moving a specific pointer using a direction key of the user interface. Meanwhile, in a case where a touch screen is provided in the user interface, a region can be designated more easily by directly touching the corresponding region. This method can receive the user-defined pattern most correctly.

In a case where the image is inputted, if the mobile device has already contained the image corresponding to the pattern in a form of the corresponding image file, a method of recognizing a pattern similar to the image designated in the given corresponding image is used. The pattern is defined using these methods, and the user is allowed to approve the defined pattern, thereby setting the specific pattern. The set pattern will be later traced in an integrated display state of the camera image and the 3D image. A processing for inducing the response of the 3D image according to the tracing result is performed.

Figure 3:
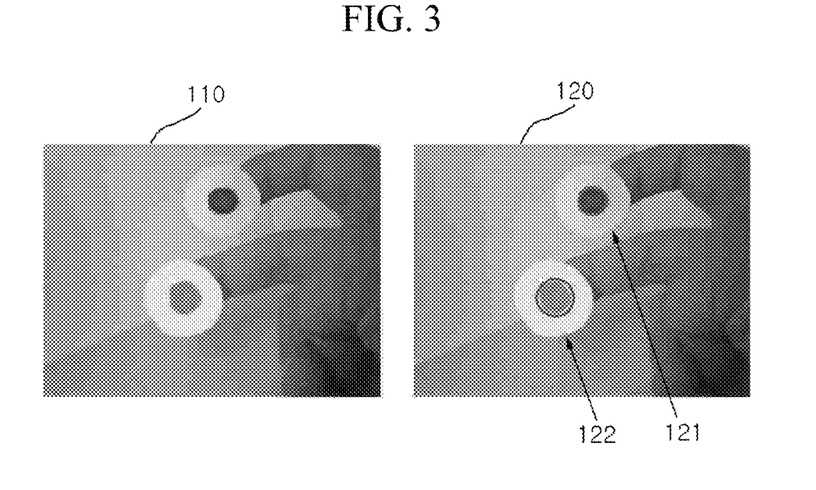
FIG. 3 is a view of exemplary images given by a method of defining a pattern according to the present invention.
Figure 4:
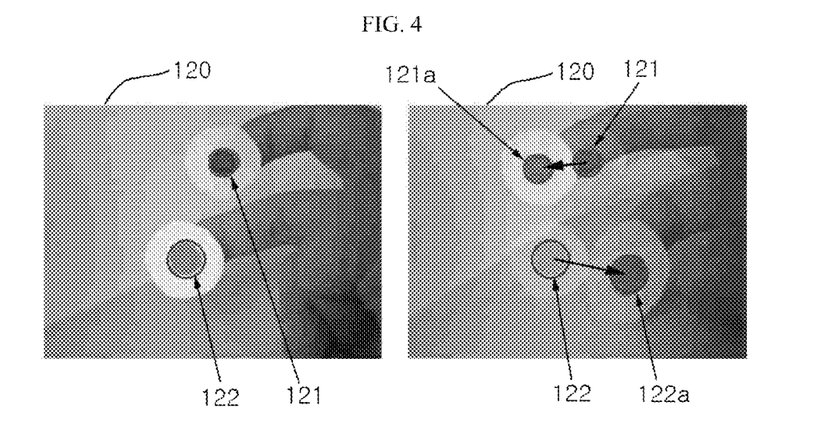
FIG. 4 is a view of exemplary images for explaining a method of tracing a motion of a pattern defined according to the present invention.

FIG. 3 illustrates an example of the pattern recognition. Two specific patterns 121 and 122 are recognized from the images 110 and 120 taken by the camera. The patterns 121 and 122 show the result recognized based on the respective colors. For example, the first pattern 121 is a blue color point and the second pattern 122 is a red color point.

Referring again to FIG. 2, in operations S21 and S22, the pattern is traced after the pattern recognition. The pattern recognition is to trace the recognized and set patterns 121 and 122 within the camera image S100 in real time. The patterns are traced through a motion estimation of the pattern of a next frame by referring to position information of the patterns 121 and 122 of a previous frame. A real-time tracing is possible.

FIG. 3 illustrates the motion tracing of the defined patterns. The two defined patterns 121 and 122 within the image 120 taken by the camera are illustrated. When the patterns 121 and 122 moves to a predetermined position, the first pattern 121 is represented as a first pattern 121a at a new position where the first pattern 121 moves, and the second pattern 122 is represented by a second pattern 122a at a new position where the second pattern 122 moves.

In operation S31, if the pattern tracing succeeds, an applied operation processing (for example, a collision test) is performed on the 2D image (the camera image containing the pattern) and the 3D image. That is, while performing the interface processing of the camera image and the 3D image by using the pattern obtained from the camera image and the display result of the 3D graphic engine, a region where the 3D object is rendered on the screen is extracted, and a region where the pattern of the camera image exists is extracted. Through these processes, it is checked whether or not two regions are intersected with each other.

Figure 5:
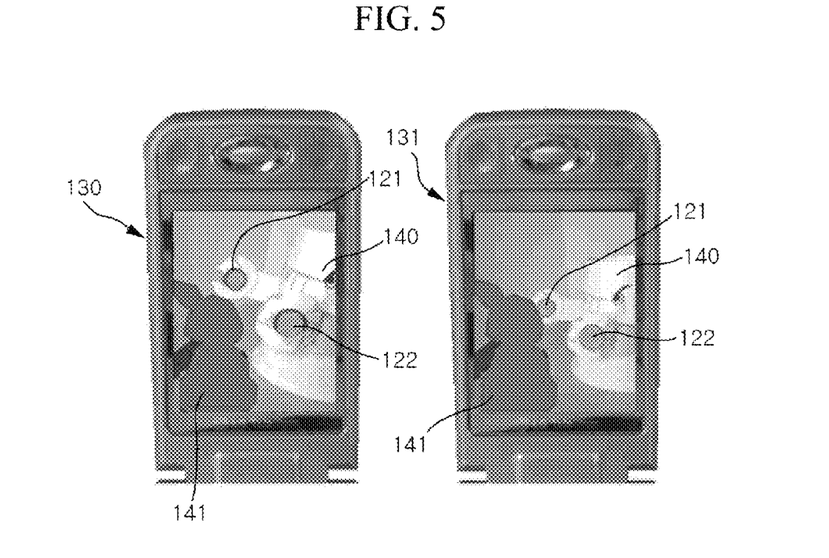
FIG. 5 is a view of exemplary images for explaining a method of testing an intersection between a rendered region of a 3D object and a pattern region.

FIG. 5 illustrates an example of the collision test. Images 130 and 131 obtained before and after the collision of the traced patterns 121 and 122 and the 3D object 141 will be described with reference to FIG. 5.

In both of the images 130 and 131 before and after the collision, user characters 140 containing the specific patterns 121 and 122 by the interface processing of the camera image and the 3D image appear in an animation form, and the corresponding 3D objects 141 also appear. As illustrated in FIG. 5, in the image 131 after the collision, the first pattern 121 of the two patterns 121 and 122 is intersected with the region where the 3D object 141 is rendered.

In operation S32, the operation result of the previous stage is reflected. For example, an animation responding after the collision is set. That is, when the specific patterns 121 and 122 contained in the user characters 140 collide with the 3D object 141, an animation (variation of the object) exhibiting a specific response in the 3D object 141 is set. In this case, an operation suitable for the application as well as the simple animation can be performed in an upper application. For example, in the case of a fighting game between the user character 140 and the 3D object 141, the patterns 121 and 122 are mapped into both fists of the user character 140 and the patterns 121 and 122 are considered as striking the 3D object 141. The 3D object 141 may fall down or frown. In addition, an operation such as increasing a score made by the user may be performed.

In operation S34, an application logic and a 3D animation are implemented based on the 3D data S200. In operation S35, the 3D animation S300 is displayed. That is, using the 3D graphic engine mounted on the mobile device, the 3D object is animated and rendered. The resulting 3D image S300 is constructed.

In operation S40, the camera image S100 and the 3D image S300 are integrated. That is, the integrated image of the rendered image of the 3D object and the camera image is generated.

In operation S50, the integrated image of the camera image and the 3D image is displayed on the display unit (LCD). In operation S60, the entire process for one frame is terminated. Then, the procedures from the pattern tracing to the displaying of the integrated image with respect to a next frame are performed.

Figure 6:
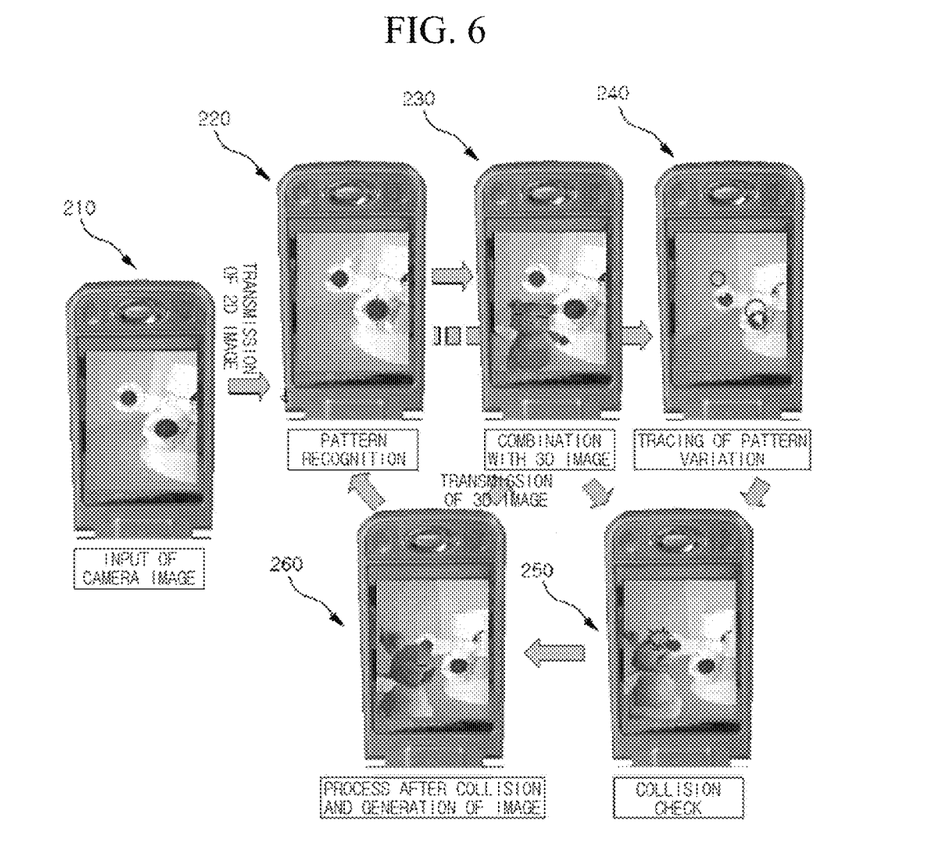
FIG. 6 is a view of exemplary images of each operation when the camera image and the 3D graphic engine are interfaced according to the present invention.

FIG. 6 illustrates an example of an image processing according to the method of processing the 3D image in the mobile device.

As described above, the image 210 for the pattern recognition is inputted using the camera. Two regions with specific colors (regions where dense specific colors are expressed) are selected from the image 210 taken by the camera and are recognized as the specific patterns defined by the user. In the next image 220, the recognized patterns are illustrated. The recognized pattern is combined with the 3D image. That is, as illustrated in the next image 230, in the 3D animation game, the picture necessary for an opponent object, which is a game object, and background is constructed by combining the patterns with the user character and then is displayed.

Next, the motion of the specific pattern defined by the user is traced and it is determined whether or not the specific pattern collides (intersected) with the rendered region of the 3D object. The image 250 is referred when the pattern region collides with the rendered region of the 3D object is referred. In this manner, when the pattern region collides with the rendered region of the 3D object, the 3D object responds (varies) as illustrated in the processed image 260 given after the collision. This response can be variously changed with respect to the motion of the specific pattern within the camera image according to the intension of the application program.

In the method of processing the 3D image in the mobile device according to the present invention, the process of recognizing the specific pattern, tracing the recognized pattern, and assigning the specific response according to the tracing result can be applied to the user interface as well as the 3D graphic engine interface.

That is, the camera image is used as a kind of user interface, such as key, fingerprint sensor, gravity sensor, and joystick. The present invention can provide the applicable utilization of the user interface through the combination with the existing interface.

For example, it is assumed that one specific pattern is recognized and set, and several image content lists are displayed. In this case, the method of selecting one content from the image content lists will be described below. In the case of the existing key input interface, the specific content can be selected using the direction key (or numerical key) and an enter key. However, according to the present invention, the existing interface can be replaced by selecting the content corresponding to the position where the specific pattern moves within the camera image.

For this purpose, the displaying of the integrated image of the content list image and the pattern image can be simply implemented by applying the method of displaying the integrated image of the camera image and the 3D image. That is, it can be considered that a mouse-cursor concept is replaced with a camera image-pattern recognition and trace concept.

The above description of the interface is merely exemplary, and various interface methods based on the camera image can be implemented based on the method of processing the 3D image in the mobile device.

It will be apparent to those skilled in the art that various modifications and variations can be made in the present invention. Thus, it is intended that the present invention covers the modifications and variations of this invention provided they come within the scope of the appended claims and their equivalent.

What is claimed is:

1. A method for interfacing images, the method comprising:
    acquiring an image of a real object via a camera, wherein the image comprises a plurality of specific patterns and the real object is a user, wherein each specific pattern of the specific patterns is designated from a color, a region, or a previously stored image file using a user-oriented passive method for defining the specific pattern by a user, wherein a characteristic of each specific pattern of the specific patterns is designated by setting a color of the specific pattern, or setting a region of the specific pattern, or selecting the previously stored image file, and the user approves the desired pattern of the defined patterns;
    recognizing a first pattern, of the plurality of specific patterns, within the acquired image, wherein the first pattern relates to a first at least one body part of the user that is moveable in order to form the first pattern;
    recognizing a second pattern, of the plurality of specific patterns, within the acquired image, wherein the second pattern relates to a second at least one body part of the user that is moveable in order to form the second pattern;
    displaying a virtual image comprising a first portion and a second portion which respectively correspond to the recognized first pattern and the recognized second pattern; displaying a previously stored first graphic image in conjunction with the virtual image;
    changing a location of the first portion of the displayed virtual image relative to the displayed first graphic image according to relative movement detected between the first at least one body part and the camera;
    changing a location of the second portion of the displayed virtual image relative to the displayed first graphic image according to relative movement detected between the second at least one body part and the camera, wherein the changing of the location of the first portion is independent of the changing of the location of the second portion;
    determining a correspondence between the displayed first graphic image and any of the first portion or the second portion of the displayed virtual image, wherein the correspondence identifies that a displayed location of a portion of the displayed first graphic image intersects with a displayed location of the first portion or the second portion of the displayed virtual image;
    increasing a value according to repeated correspondence between the displayed first graphic image and either the first portion or the second portion of the displayed virtual image;
    performing an animation process responsive to an occurrence of the correspondence between the displayed first graphic image and any of the first portion or the second portion of the displayed virtual image, wherein the animation process causes a change in location of the displayed first graphic image such that the determined correspondence between the displayed first graphic image and the first portion or the second portion of the displayed virtual image no longer occurs, and wherein the animation process further causes a change in displayed content of a portion of the displayed first graphic image;
    displaying a third graphic image that is different from each of the virtual image, and the displayed first graphic image, the displaying of the third graphic image occurring responsive to an occurrence of the correspondence between the displayed first graphic image and any of the first portion or the second portion of the displayed virtual image; and
    ceasing the displaying of the third graphic image after a period of time.

2. The method according to claim 1, wherein the displayed virtual image moves responsive to the occurrence of the correspondence.

3. The method according to claim 1, wherein the method is performed in one of a mobile phone, a PDA (personal digital assistant), a PDA phone, a smart phone, a notebook computer, or a PMP (portable multimedia player).

4. The method according to claim 1, wherein the relative movement between the first at least one body part and the camera and between the second at least one body part and the camera are detected in real time.

5. The method according to claim 1, wherein the relative movement between the first at least one body part and the camera and between the second at least one body part and the camera are detected in real time by comparing frames in the acquired image.

6. The method according to claim 1, wherein the first and second patterns are defined by the user.

7. The method according to claim 1, wherein the stored first graphic image comprises a plurality of images including a specific image representing a user controlled image.

8. The method according to claim 1, wherein the acquired image including the first and second patterns comprises an image of the user.

9. The method according to claim 1, wherein the animation process results in a different type of animation according to a degree of the correspondence between the displayed first graphic image and any of the first portion or the second portion of the displayed virtual image.

10. The method according to claim 1, wherein at least the first graphic image or the virtual image is displayed differently after the animation process is performed.

11. A method of controlling an apparatus by interfacing images, the method comprising:
    acquiring an image of a real object via a camera, wherein the image comprises a plurality of specific patterns and the real object is a user, wherein each specific pattern of the specific patterns is designated from a color, a region, or a previously stored image file using a user-oriented passive method for defining the specific pattern by a user, wherein a characteristic of each specific pattern of the specific patterns is designated by setting a color of the specific pattern, or setting a region of the specific pattern, or selecting the previously stored image file, and the user approves the desired pattern of the defined patterns;
    recognizing a first pattern, of the plurality of specific patterns, within the acquired image, wherein the first pattern relates to a first at least one body part of the user that is moveable in order to form the first pattern;
    recognizing a second pattern, of the plurality of specific patterns, within the acquired image, wherein the second pattern relates to a second at least one body part of the user that is moveable in order to form the second pattern;

displaying a virtual image comprising a first portion and a second portion which respectively correspond to the recognized first pattern and the recognized second pattern;

displaying a previously stored first graphic image in conjunction with the virtual image;

changing a location of the first portion of the displayed virtual image relative to the displayed first graphic image according to relative movement detected between the first at least one body part and the camera, wherein the changing of the location of the first portion is independent of the changing of the location of the second portion;

changing a location of the second portion of the displayed virtual image relative to the displayed first graphic image according to relative movement detected between the second at least one body part and the camera;

determining a correspondence between the displayed first graphic image and any of the first portion or the second portion of the displayed virtual image, wherein the correspondence identifies that a displayed location of a portion of the displayed first graphic image intersects with a displayed location of the first portion or the second portion of the displayed virtual image;

increasing a value according to repeated correspondence between the displayed first graphic image and either the first portion or the second portion of the displayed virtual image;

performing an animation process responsive to an occurrence of the correspondence between the displayed first graphic image and any of the first portion or the second portion of the displayed virtual image, wherein the animation process causes a change in location of the displayed first graphic image such that the determined correspondence between the displayed first graphic image and the first portion or the second portion of the displayed virtual image no longer occurs, and wherein the animation process further causes a change in displayed content of a portion of the displayed first graphic image;

displaying a third graphic image that is different from each of the virtual image, and the displayed first graphic image, the displaying of the third graphic image occurring responsive to an occurrence of the correspondence between the displayed first graphic image and any of the first portion or the second portion of the displayed virtual image; and ceasing the displaying of the third graphic image after a period of time;

controlling the apparatus in response to an occurrence of the correspondence between the displayed first graphic image and any of the first portion or the second portion of the displayed virtual image, wherein the apparatus comprises one of a mobile phone, a PDA (personal digital assistant), a PDA phone, a smart phone, a notebook computer, or a PMP (portable multimedia player).

12. The method according to claim 11, wherein the displayed virtual image is movable responsive to the occurrence of the correspondence between the displayed first graphic image and either the first portion or the second portion of the displayed virtual image.

13. The method according to claim 11, wherein the relative movement between the first at least one body part and the camera and between the second at least one body part and the camera is detected in real time.

14. The method according to claim 11, wherein the relative movement between the first at least one body part and the camera and between the second at least one body part and the camera is detected by comparing frames in the acquired image.

15. The method according to claim 11, wherein the apparatus is controlled to perform a different function according to a degree of the correspondence between the displayed first graphic image and any of the first portion or the second portion of the displayed virtual image.

16. An apparatus comprising:

a camera configured to acquire an image of a real object, the image comprising a plurality of specific patterns and the real object is a user, wherein each specific pattern of the specific patterns is designated from a color, a region, or a previously stored image file using a user-oriented passive method for defining the specific pattern by a user, wherein a characteristic of each specific pattern of the specific patterns is designated by setting a color of the specific pattern, or setting a region of the specific pattern, or selecting the previously stored image file, and the user approves the desired pattern of the defined patterns;

a processor configured to recognize a first pattern, of the plurality of specific patterns, within the acquired image, wherein the first pattern relates to a first at least one body part of the user that is moveable in order to form the first pattern, and being further configured to recognize a second pattern, of the plurality of specific patterns, within the acquired image, wherein the second pattern relates to a second at least one body part of the user that is moveable in order to form the second pattern;

a memory configured to store a first graphic image;

a display configured to display a virtual image comprising a first portion and a second portion which respectively correspond to the recognized first pattern and the recognized second pattern;

the display further configured to display the stored first graphic image in conjunction with the virtual image, wherein the processor is further configured to:

cause a change in location of the first portion of the displayed virtual image relative to the displayed first graphic image according to relative movement detected between the first at least one body part and the camera;

cause a change in location of the second portion of the displayed virtual image relative to the displayed first graphic image according to relative movement detected between the second at least one body part and the camera, wherein the change in the location of the first portion is independent of the change in the location of the second portion;

determine a correspondence between the displayed first graphic image and any of the first portion or the second portion of the displayed virtual image, wherein the correspondence identifies that a displayed location of a portion of the displayed first graphic image intersects with a displayed location of the first portion or the second portion of the displayed virtual image;

increasing a value according to repeated correspondence between the displayed first graphic image and either the first portion or the second portion of the displayed virtual image;

perform an animation process responsive to an occurrence of the correspondence between the displayed first graphic image and any of the first portion or the second portion of the displayed virtual image, wherein the animation process causes a change in location of the displayed first graphic image such that the determined correspondence between the displayed first graphic image and the first portion or the second portion of the displayed virtual image no longer occurs, and wherein the animation process further causes a change in displayed content of a portion of the displayed first graphic image;

cause the display to display a third graphic image that is different from each of the virtual image, and the displayed first graphic image, the displaying of the third graphic image occurring responsive to an occurrence of the correspondence between the displayed first graphic image and any of the first portion or the second portion of the displayed virtual image; and cause the display to cease the displaying of the third graphic image after a period of time.

17. An apparatus comprising:

a camera configured to acquire an image of a real object, the image comprising a plurality of specific patterns and the real object is a user, wherein each specific pattern of the specific patterns is designated from a color, a region, or a previously stored image file using a user-oriented passive method for defining the specific pattern by a user, wherein a characteristic of each specific pattern of the specific patterns is designated by setting a color of the specific pattern, or setting a region of the specific pattern, or selecting the previously stored image file, and the user approves the desired pattern of the defined patterns;

a processor configured to recognize a first pattern, of the plurality of specific patterns, within the acquired image, wherein the first pattern relates to a first at least one body part of the user that is moveable in order to form the first pattern, and being further configured to recognize a second pattern, of the plurality of specific patterns, within the acquired image, wherein the second pattern relates to a second at least one body part of the user that is moveable in order to form the second pattern;

a memory configured to store a first graphic image; and a display configured to display a virtual image which corresponds to the recognized specific pattern, the display further configured to display a previously stored first graphic image in conjunction with the virtual image, wherein the processor is further configured to:

cause a change in location of the first portion of the displayed virtual image relative to the displayed first graphic image according to relative movement detected between the first at least one body part and the camera;

cause a change in location of the second portion of the displayed virtual image relative to the displayed first graphic image according to relative movement detected between the second at least one body part and the camera, wherein the change in the location of the first portion is independent of the change in the location of the second portion;

determine a correspondence between the displayed first graphic image and any of the first portion or the second portion of the displayed virtual image, wherein the correspondence identifies that a displayed location of a portion of the displayed first graphic image intersects with a displayed location of the first portion or the second portion of the displayed virtual image;

increasing a value according to repeated correspondence between the displayed first graphic image and either the first portion or the second portion of the displayed virtual image;

perform an animation process responsive to an occurrence of the correspondence between the displayed first graphic image and any of the first portion or the second portion of the displayed virtual image, wherein the animation process causes a change in location of the displayed first graphic image such that the determined correspondence between the displayed first graphic image and the first portion or the second portion of the displayed virtual image no longer occurs, and wherein the animation process further causes a change in displayed content of a portion of the displayed first graphic image;

cause the display to display a third graphic image that is different from each of the virtual image, and the displayed first graphic image, the displaying of the third graphic image occurring responsive to an occurrence of the correspondence between the displayed first graphic image and any of the first portion or the second portion of the displayed virtual image;

cause the display to cease the displaying of the third graphic image after a period of time; and control the apparatus in response to an occurrence of the correspondence between the displayed first graphic image and any of the first portion or the second portion of the displayed virtual image.

* * * * *